United States Patent Office 3,640,913
Patented Feb. 8, 1972

3,640,913
PROCESS FOR HEATING POLYMERS WITH
DIELECTRIC HEATING
Peter A. Cerra, Bay City, Mich., assignor to The Dow
Chemical Company, Midland, Mich.
No Drawing. Filed Apr. 17, 1969, Ser. No. 817,203
Int. Cl. C08f 47/10
U.S. Cl. 260—2.5 R                                    8 Claims

ABSTRACT OF THE DISCLOSURE

Polymers are rapidly heated by an improved process wherein (1) a composition containing an organic polymer is blended with a zinc halide and (2) the resultant blend is heated by applying to it a high frequency alternating electric field. The improved process is particularly useful in preparing foamed polymers wherein a conventional blowing agent is incorporated into a blend of organic polymer and zinc halide and the blend is then dielectrically heated.

BACKGROUND OF THE INVENTION

This invention relates to a process for rapidly heating organic polymers, and more particularly, to rapidly heating an organic polymer with dielectric heating means.

It has been a practice in the art to heat organic polymers in the preparation of foamed polymers. In accordance with conventional practices, foamed polymers are made by incorporating into a polymer mass a substance which greatly expands in volume upon treating it in a suitable manner, usually by heating the polymer mass. Usually the substance (a so-called blowing agent) is a liquid, gas or solid or a mixture of liquids, gases and/or solids which on being heated gives rise to a relatively large volume of gas or vapor. The foamed polymers are useful as materials for cushioning and shock absorbing applications, as for example, as padding in cushion packaging for delicate objects such as furniture, lamps, tableware and the like.

In other applications, it has often been desirable to preheat organic polymer prior to the application, for example, preheating before molding or blending the organic polymer and the like.

In typical methods of heating a polymeric composition, external heat, often by means of steam, is applied to the mixture. However, since most polymers are poor conductors of heat, such heating methods are relatively slow and inefficient.

In more recent years it has been a practice of the art to employ internal heating techniques wherein the polymer composition is passed into a high frequency alternating electrical field (often called dielectric heating means). The heating of a material placed in a high frequency alternating electrical field is due to the movement of molecules which is in turn caused by the dipole rotation or ionic oscillation of the molecule. As is commonly understood, the heat liberated in the material by a changing or alternating electric field depends on the dielectric loss factor (so-called power factor) of the particular material being heated and is proportional to the frequency of the electrical supply and to the square of the impressed voltage.

The power factor of the polymer is often too low to permit rapid heating by a dielectric heating means. In such instances, it has been the practice in the art to incorporate an additive which has a high power factor into the polymer. Unfortunately most additives do not effectuate the short heating time desired and/or such additives often have a deleterious effect on the polymer.

In view of the lengthy times required to heat polymeric compositions by conventional methods, it would be highly desirable to provide a quick and efficient method for heating organic polymers.

SUMMARY OF THE INVENTION

In accordance with this invention compositions containing organic polymers are heated rapidly and efficiently by an improved process wherein the polymer is subjected to dielectric heating to generate heat inside the polymer. Accordingly the improvement comprises blending a zinc halide with the polymer prior to subjecting the polymer to dielectric heating.

The improved process of this invention is particularly useful in preparing foamed polymers wherein a polymer composition containing a conventional blowing agent is heated by dielectric heating means. Accordingly the heating rate of the polymer composition is increased by incorporating a zinc halide into a polymer either before, after or during incorporation of the conventional blowing agent into the polymer.

This improved process also provides an efficient means for quickly preheating a polymer before working the polymer, for example, extruding, injection or compression molding and the like.

DESCRIPTION OF THE PREFERRED EMBODIMENTS

The improved process of this invention is generally applicable to essentially all organic polymers. However, it is particularly applicable to normally solid, thermoplastic organic polymers and especially to thermoplastic organic addition polymers containing a plurality of polar groups such as carboxylic acid groups in the polymer structure.

Representative polymers suitably used in the improved process of this invention include the polymerized and copolymerized ethylenically unsaturated monomers such as the monovinylidene aromatic compounds, e.g., styrene, α-methylstyrene, ar-methyl styrene, chlorostyrene and other aromatic olefins; the α-mono olefins and conjugated diolefins, e.g., ethylene, propylene, butene-1, 1,3-butadiene, isoprene and other aliphatic olefins; the unsaturated carboxylic acid esters including the alkyl esters of α,β-ethylenically unsaturated carboxylic acids such as ethyl acrylate, methyl methacrylate, butyl acrylate, etc. and the unsaturated esters of saturated carboxylic acids such as vinyl acetate, vinyl propionate, etc.; and other vinyl compounds, e.g., vinyl and vinylidene chloride, vinyl ethers, acrylamide, acrylonitrile and the like. Of especially preferred utility in this improved process are the thermoplastic organic addition polymers containing a plurality of carboxylic acid groups in the polymer structure such as the polymers of acrylic acid, methacrylic acid, itaconic acid, maleic acid and anhydride, fumaric acid, citraconic acid and anhydride, methyl hydrogen maleate and particularly copolymers of the above named acids with the aforementioned ethylenically unsaturated monomers, for example, ethylene/acrylic acid copolymers, styrene/methacrylic acid copolymers, ethylene/vinyl acetate/acrylic acid copolymers and the like. Methods for preparation of such polymers are well known to those skilled in the art.

Zinc halides which are suitably incorporated into polymers for the purposes of this invention are zinc chloride, zinc bromide, zinc fluoride and zinc iodide, with zinc chloride and zinc bromide being preferred.

Various additives, particularly various blowing agents, activators and/or stabilizers therefor are optionally incorporated into the polymer composition either before or after incorporation of the zinc halide into the polymer. Conventional blowing agents which are often used to form organic polymers which are also suitable for use in this invention include gases and volatile liquids at ordinary temperatures and pressures such as the aliphatic or cyclo-aliphatic hydrocarbons boiling between about 0° C. and 60° C., e.g., butane, pentanes and their mixtures with hexane, petroleum ether and mixtures thereof with hexane and cyclohexane; the perchlorofluorocarbons, e.g., $CCl_3F$, $CCl_2F_2$, $CClF_3$, $CCl_2F-CCl_2F$, $CClF_2-CCl_2F$, $CClF_2-CClF_2$, $CF_3-CClF_2$,

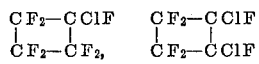

and the like; mixtures of any two or more of the above and other conventional liquid and gaseous blowing agents. Also, suitable blowing agents include conventional solid blowing agents such as hexamminenickel (II) sulfate, p,p'-oxybis(benzenesulfonyl hydrazide), azodicarbamide and the like. When blowing agents are used, they are incorporated in conventional amounts, i.e., from about 0.05 to about 30 weight percent based on the polymer. Other ingredients such as fillers, antioxidants and the like may also be present in the polymer while carrying out the improved process of this invention.

The improved process of this invention is carried out by the essential steps of (1) blending from about 0.2 to about 30 weight percent based on the polymer of a zinc halide with a suitable polymer to obtain a uniform dispersion of the zinc halide throughout the polymer and (2) subjecting the resultant blend to dielectric heat, preferably by passing the blend through a high frequency alternating electric field. In preferred embodiments from about 0.5 to about 15 weight percent of zinc chloride is blended with the polymer.

Ordinarily, the zinc halide in the form of anhydrous, finely divided particles is blended with the polymer by a mechanical technique such as milling at a temperature above the softening point of the polymer until a uniform dispersion of zinc halide in the polymer is obtained. However, in instances where a conventional amount of a blowing agent has been previously incorporated into the polymer, it is desirable to blend the zinc halide and polymer composition at temperatures below the volatilization or decomposition point of the blowing agent in order to avoid foaming. Mechanical means employed to blend the zinc halide and polymer include two-roll mills, extruders and the like.

The blend of zinc halide and polymer is delivered to and passed through a high frequency electrical field by any one of several conventional means, for example, a conveyor belt for carrying the blend through the electrical field.

It is usually desirable to maintain the field strength and frequency of the electrical field at maximum practical values since the time needed to attain the temperature required to heat plastify the polymer is less at higher frequency and field strength. Practically speaking, the frequency is maintained at RF frequencies allocated by the Federal Communication Commission for industrial RF heating, i.e., at the present 13.56, 27.12 and 40.68 megacycles. In general, the maximum for field strength varies with the system and the apparatus used. As an illustration an apparatus having 15" x 15" electrodes has a peak RF voltage at 20 kv. For the purposes of this invention, however, field strength at 7.5 kv. is sufficient.

In general, any type of dielectric heating apparatus capable of producing an electric field having the desired frequency and field strength is suitable. As an illustration and not for the purpose of limitation, a dielectric oven having a 7.5 kv. output at 27.32 megacycles per second and a peak RF voltage on 15" x 15" electrodes of 20 kv. at a plate separation of 2.25 inches satisfies the requirements of the improved process of this invention.

The following examples are given to illustrate more clearly the principle and practice of this invention to those skilled in the art and are not for the purpose of limitation. Throughout this specification and claims, all parts and percentages are by weight unless otherwise indicated.

EXAMPLE 1

A 7-part portion of an anhydrous powder of zinc chloride is blended on a 3-inch two-roll mill at 110–115° C. with 93 parts of a copolymer of 92 percent ethylene and 8 percent acrylic acid. The resulting blend is compression molded to samples 0.75 inch in diameter and 0.5 inch thick, and a sample at room temperature is heated in a dielectric oven with an electrode spacing of 1.5 inches and a 7.5 kv. output at 27.32 megacycles operating at 2000 volts/cm. at 27 mHz. The results are shown in Table I. For the purposes of comparison a sample of the copolymer without zinc chloride is heated under the same conditions. An increase in temperature of less than 20° C. is reached after 75 seconds.

Also for the purposes of comparison and to particularly point out this invention, several blends of the copolymer with equivalent amounts of other metal chlorides are prepared in the same manner and compression molded to form samples ($C_x$) of the same size. The samples ($C_x$) are heated according to the conditions described above and the results are recorded in Table I.

TABLE I

| Example No. | Metal chloride | Temperature (° C.) after— | | | | |
| --- | --- | --- | --- | --- | --- | --- |
| | | 15 sec. | 45 sec. | 60 sec. | 75 sec. | 120 sec. |
| 1 | $ZnCl_2$ | 46 | 90 | 116 | 148 | |
| $C_1$* | $NiCl_2$ | 30 | | 38 | | 55 |
| $C_2$* | $AlCl_3$ | 30 | | 46 | | 64 |
| $C_3$* | NaCl | 31 | 37 | 41 | | 52 |
| $C_4$* | CsCl | 28 | 33 | 35 | 37 | 45 |
| $C_5$* | $CaCl_2$ | 30 | 37 | 40 | 45 | 54 |
| $C_6$* | $CdCl_2$ | 29 | 33 | 35 | 37 | 44 |

*Not an example of this invention.

EXAMPLE 2

A blend is prepared according to Example 1 except that zinc bromide is used instead of zinc chloride. The resulting blend is compression molded to form samples 0.75 inch in diameter and 0.5 inch thick and a sample is heated according to the conditions described in Example 1. The blend reached a temperature of 146° C. after 120 seconds.

EXAMPLE 3

A 10-part portion of azodicarbamide is mixed with a blend according to Example 1 on a 3-inch two-roll mill at 110–115° C. The resulting mixture is dielectrically heated according to conditions of Example 1 to produce a stable foam having a density of 5–9 lbs./ft.$^3$.

EXAMPLE 4

A 7.6-part portion of an anhydrous powder of zinc chloride is blended on a 3-inch two-roll mill at 150° C. with 100 parts of polyethylene having a melt index as determined by ASTM D-1238-65T(E) of 2.0 decig./min. and a density of 0.919. The resulting blend is compression molded to form samples 0.75 inch in diameter and 0.5 inch thick and a sample is heated according to the conditions of Example 1 and the results are recorded in Table II.

For the purposes of comparison several blends containing equivalent amounts of various metal chlorides were prepared in a similar manner and likewise compression molded to form samples of the same size. The samples ($C_x$) are also heated according to the conditions used above and the results are recorded in Table II.

TABLE II

| Example No. | Metal chloride | Temperature (° C.) after— | | |
| --- | --- | --- | --- | --- |
| | | 15 sec. | 60 sec. | 120 sec. |
| 3 | $ZnCl_2$ | 43 | 73 | 96 |
| $C_7$* | $NiCl_2$ | 30 | 37 | 44 |
| $C_8$* | $AlCl_3$ | 31 | 40 | 64 |
| $C_9$* | $CuCl_2$ | 30 | 39 | 63 |
| $C_{10}$* | NaCl | 31 | 45 | 55 |

*Not an example of this invention.

What is claimed is:

1. In a process for heating organic polymers wherein the polymer is subjected to dielectric heating to generate heat inside the polymer; the improvement which comprises blending from about 0.2 to about 30 weight percent of a zinc halide based on the polymer with the polymer prior to subjecting the polymer to dielectric heating.

2. The improvement according to claim 1 wherein the zinc halide is zinc chloride.

3. The improvement according to claim 1 wherein the zinc halide is zinc bromide.

4. The improvement according to claim 1 wherein the polymer is an ethylene/acrylic acid copolymer.

5. The improvement according to claim 1 wherein the polymer is polyethylene.

6. The improvement according to claim 1 wherein a blowing agent is included in the blend of zinc halide and polymer.

7. The improvement according to claim 6 wherein a conventional amount of a blowing agent is incorporated into the resulting blend of zinc halide and the polymer prior to subjecting the polymer to dielectric heating.

8. The improvement according to claim 7 wherein the blowing agent is azodicarbamide.

References Cited

UNITED STATES PATENTS

| 2,280,771 | 4/1942 | Dufour et al. | 264—26 |
| 2,998,501 | 8/1961 | Edberg et al. | 264—26 |

FOREIGN PATENTS

| 517,798 | 2/1940 | Great Britain | 264—26 |

MURRAY TILLMAN, Primary Examiner

W. J. BRIGGS, SR., Assistant Examiner

U.S. Cl. X.R.

204—165; 260—88.1 R, 94.9 GD; 264—26, 51